(12) United States Patent
Li et al.

(10) Patent No.: US 8,899,472 B2
(45) Date of Patent: *Dec. 2, 2014

(54) METHOD FOR SEALING VACUUM GLASS AND VACUUM GLASS PRODUCT

(75) Inventors: Yanbing Li, Henan (CN); Zhangsheng Wang, Henan (CN)

(73) Assignee: Luoyang Landglass Technology Co., Ltd, Henan (CN)

( * ) Notice: Subject to any disclaimer, the term of this patent is extended or adjusted under 35 U.S.C. 154(b) by 239 days.

This patent is subject to a terminal disclaimer.

(21) Appl. No.: 13/511,740

(22) PCT Filed: Oct. 29, 2010

(86) PCT No.: PCT/CN2010/078234
§ 371 (c)(1),
(2), (4) Date: Aug. 1, 2012

(87) PCT Pub. No.: WO2011/063696
PCT Pub. Date: Jun. 3, 2011

(65) Prior Publication Data
US 2012/0321821 A1 Dec. 20, 2012

(30) Foreign Application Priority Data

Nov. 27, 2009 (CN) .......................... 2009 1 0250137

(51) Int. Cl.
*B23K 31/02* (2006.01)
*C03C 27/08* (2006.01)
*B23K 1/00* (2006.01)
*E06B 3/663* (2006.01)
*E06B 3/673* (2006.01)

(52) U.S. Cl.
CPC .............. *C03C 27/08* (2013.01); *B23K 1/0008* (2013.01); *E06B 3/66304* (2013.01); *E06B 3/66357* (2013.01); *E06B 3/67334* (2013.01)
USPC ........................ 228/121; 228/110.1; 228/175

(58) Field of Classification Search
None
See application file for complete search history.

(56) References Cited

U.S. PATENT DOCUMENTS 2,336,544 A * 12/1943 Hopfield ........................ 228/188
6,160,645 A    12/2000 Chandross et al.
(Continued)

FOREIGN PATENT DOCUMENTS

CN      101302081 A     11/2008
DE      WO 2009/000256 A1 * 12/2008
(Continued)

*Primary Examiner* — Kiley Stoner
(74) *Attorney, Agent, or Firm* — AKC Patents, LLC; Aliki K. Collins

(57) ABSTRACT

A method for sealing vacuum glass and a vacuum glass product processed by said method are provided. The method specifically is: preparing metallized layers (6) consolidated with glass plates on the surface to be sealed at the edge of the glass plates by the known sintering process; enabling hermetically sealing the edges of the two glass plates (1, 2) by welding and connecting metal sealing sheet (7) between the metallized layers (6) of the tow glass plates to be hermetically sealed. A brand new technology for manufacturing vacuum glass is provided by sintering metallized layers on the surface of the glass plates, and hermetically sealing the edges of the glass plates by use of the metallized layers and metal sealing sheet. This method not only has the advantage of firm connection at the sealing part, high air-tightness, good thermal impact resistance, but also ensures safe use of the vacuum glass by the use of the metal sealing sheet which can well adapt to the temperature deformation of the inner and outer glass plates of the vacuum glass produced by the difference in temperature.

4 Claims, 7 Drawing Sheets

(56) References Cited

U.S. PATENT DOCUMENTS

| | | | |
|---|---|---|---|
| 7,204,102 B1 * | 4/2007 | Eames et al. | 65/36 |
| 8,512,829 B2 * | 8/2013 | Cooper | 428/34 |
| 2001/0026852 A1 * | 10/2001 | Poix et al. | 428/34 |
| 2002/0035852 A1 * | 3/2002 | Wang et al. | 65/34 |
| 2002/0046797 A1 * | 4/2002 | Collins | 156/107 |
| 2003/0151787 A1 | 8/2003 | Slater et al. | |
| 2008/0166570 A1 | 7/2008 | Cooper | |
| 2008/0245011 A1 * | 10/2008 | Friedl | 52/407.5 |
| 2010/0276473 A1 * | 11/2010 | Hagen et al. | 228/121 |

FOREIGN PATENT DOCUMENTS

| | | | |
|---|---|---|---|
| GB | 2207669 A | * | 2/1989 |
| JP | 60-230335 A | * | 11/1985 |
| JP | 2000-063156 A | * | 2/2000 |

\* cited by examiner

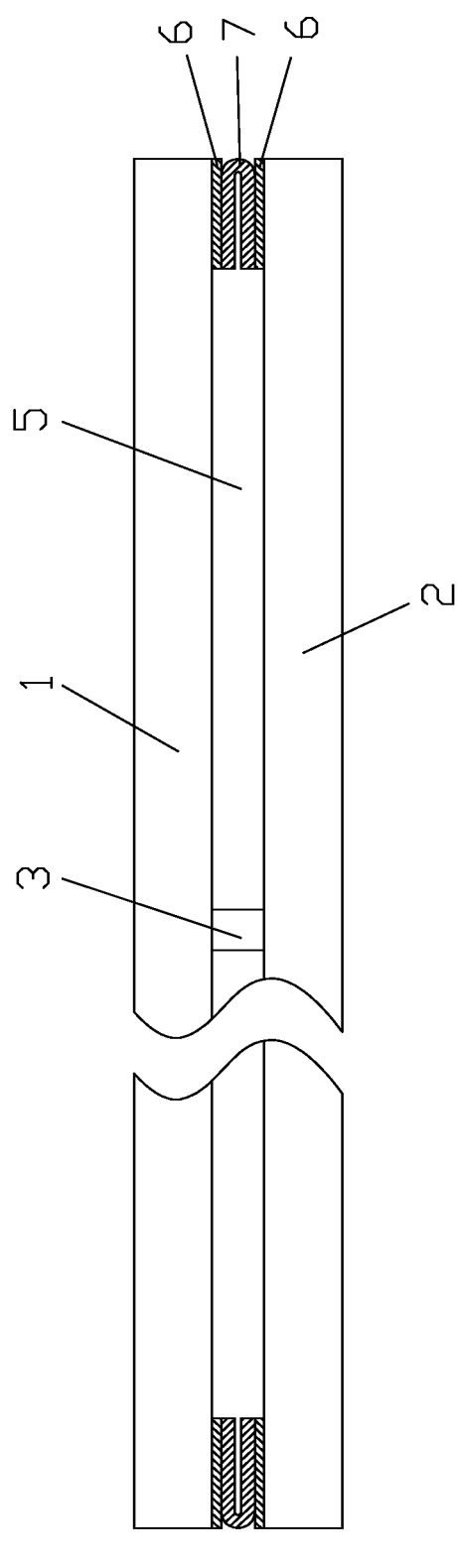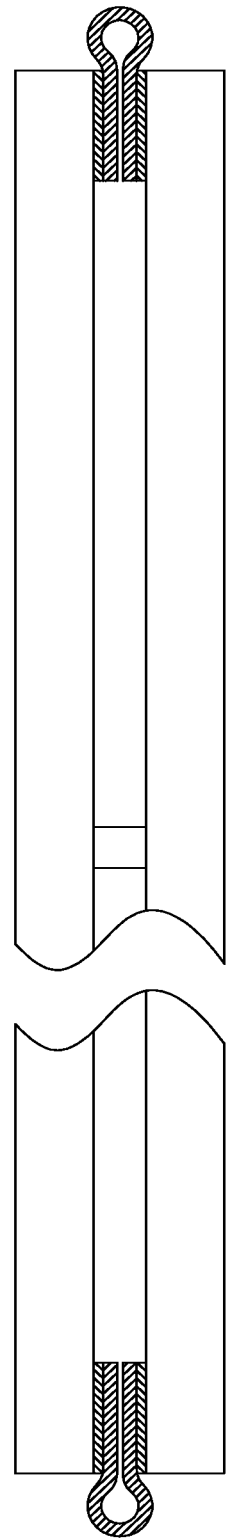
FIG. 4
FIG. 6

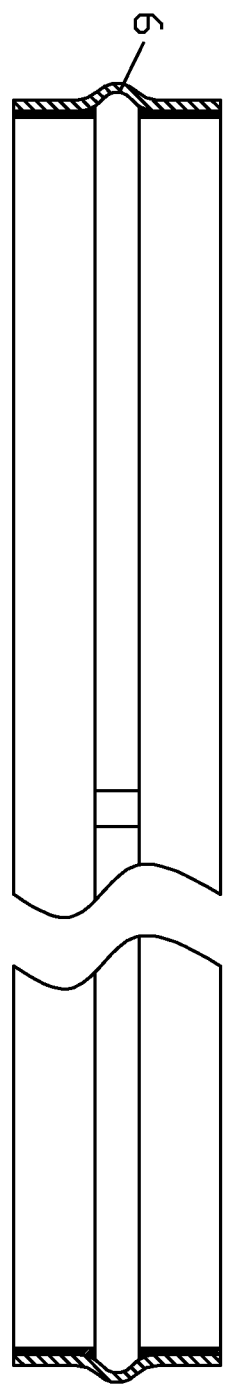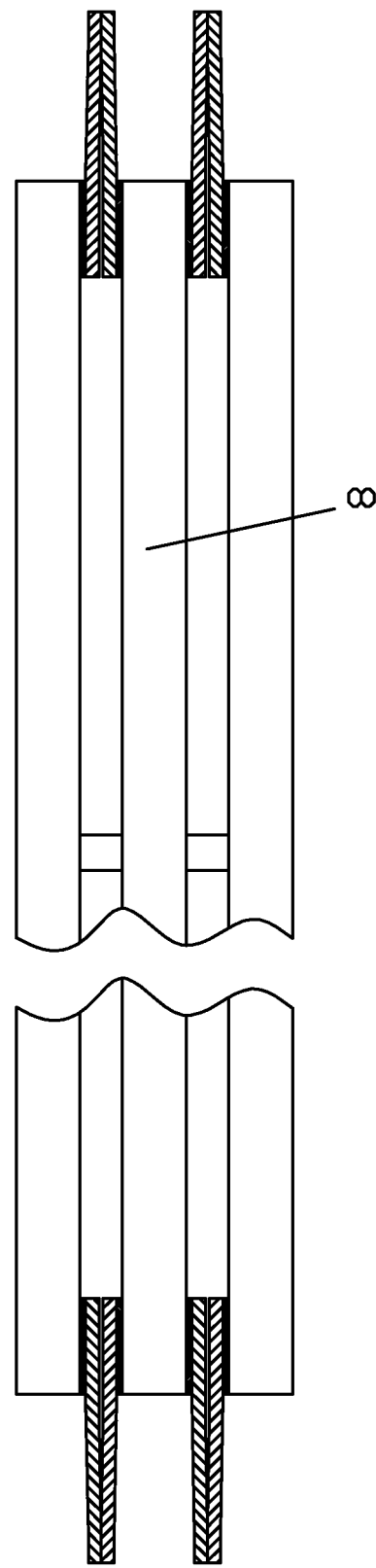
FIG. 14
FIG. 15

METHOD FOR SEALING VACUUM GLASS AND VACUUM GLASS PRODUCT

TECHNICAL FIELD

The present invention relates to a method for sealing a vacuum glass and a vacuum glass product processed by using the method.

BACKGROUND ART

A vacuum glass formed by compounding a plurality of glass plates gains attention owing to excellent sound proof and heat insulating performance thereof, and becomes a research subject.

The existing sealing methods for the vacuum glass are mainly as follows:

(1) Use frits with a low melting point to be melted for sealing, wherein the sealing temperature is 400-500° C. or so in general, and by means of flame or electrical heating, the frits with the low melting point are melted so as to complete the compound sealing between the glass plates. The frit with the low melting point used by the process is usually lead-zinc series (PbO—ZnO) sealing glass material, and such material is deemed as against to environmental protection requirements for its future development since lead is harmful to the environment and human bodies. Meanwhile, equipment and processes for processing the material are complicated, and the glass plates after compound sealing can also generate boundary heat stress frequently, thereby needing an additional proper annealing treatment which greatly lowers the production efficiency.

(2) Adopt various plastic or resin materials to carry out the compound sealing between the glass plates. Some patent documents mention that organic glasses such as PC, ABS, LDPE, PVC and the like are used, sandwich glass materials such as PVB, EVA (EN) and the like are used in some patent documents, and processing methods for the materials are always as follows: place the above materials between two glass plates to be made into prefabricated parts, and then press the prefabricated parts under appropriate conditions. Such process is similar to the process for manufacturing sandwich glasses, and can realize the compound sealing between glass plates. However, it is difficult to guarantee the leakage at the joints because the gas permeability and moisture permeability of majorities of the plastic and resin materials are far greater than those of glasses, and majorities of the organic materials are only physically bonded with surfaces of the glass plates; and decrease in sealing strength, interlayer dewing and mildewing of glass will be directly occurred in case of permeation of gases (including water vapor). In addition, the aging of the organic material will have a direct influence on the sealing effect and life of the compounded glass plates as time goes on.

In addition, when the vacuum glass was made by using a plurality of glass plates in the past, sealing of the edges of the glass plates was completed generally by rigidly connecting the edges of the plurality of glass plates, whose structure is shown as FIG. 1. Because the vacuum glass has excellent heat insulating performance, during in use, the inner and outer glass plates easily generate great temperature difference, the glass plate at the high-temperature side is expanded, and the glass plate at the low-temperature side is shrunk; no matter the vacuum glass of the structure shown as the FIG. 1 is used as a glass window or a heat insulating member, temperature deformation shown as FIG. 2 is easily generated; and once the stress formed by the deformation on the sealed edges of the glass plates exceeds the bearing limit of the sealed edges, the vacuum glass is inevitably damaged, and danger is brought to the place using of the vacuum glass.

Invention Contents

Aiming at defects in the prior art, the purpose of the present invention is to provide a method for sealing vacuum glass, which is simple and convenient in process and reliable and firm in sealing. The vacuum glass sealed by using the method can well adapt to the deformation generated by the temperature difference between the inner and outer glass plates. Heavy high temperature stress formed on the sealed edges is avoided, and the using safety of the vacuum glass is ensured. The present invention also provides a vacuum glass product processed according to the sealing method of the present invention. For this purpose, the method for sealing the vacuum glass according to the present invention comprises the following steps:

1) preparing metallized layers consolidated with glass plates on the surface to be sealed at the edge of the glass plates by the known sintering process; and 2) connecting a metal sealing sheet between the metallized layers of the two glass plates to be sealed in an air-tight welding manner to realize air-tight sealing of the edges of the two glass plates.

Further, the sintering process comprises the following steps:

1-1) preparing a metal paste coating on the surfaces to be sealed on the edges of the glass plates; and 1-2) heating the glass plates to sinter the metal paste coating into the metallized layers consolidated with the glass plates.

Further, the metal paste coating is prepared on the surfaces of the glass plates in a manner of dip coating, spray coating, screen printing, manual coating or mechanical coating.

Further, the metal sealing sheet consists of two metal sheets; when the edges of the two glass plates are sealed in an air-tight manner, the two metal sheets are alternatively connected with the metallized layers on the two glass plates to be sealed in an air-tight welding manner by a metal brazing process or an ultrasonic welding process, and the two metal sheets are connected in an air-tight welding manner to realize air-tight sealing of the edges of the two glass plates.

Further, after the two metal sheets are respectively led out of the connected glass plates, the two metal sheets are mutually connected in an air-tight welding manner by a metal brazing process or an ultrasonic welding process or a melt welding process.

Further, the two metal sheets are led out of the space between the two glass plates to be sealed, and the two metal sheets are respectively connected with the metallized layers on the inner surfaces of the two glass plates to be sealed in an air-tight welding manner.

Further, one of the two metal sheets is led out of the space between the two glass plates to be sealed, the led-out metal sheet is connected with the metallized layer on the inner surface of one glass plate in an air-tight welding manner, and the other metal sheet is connected with the metallized layer on the outer surface of the other glass plate in an air-tight welding manner.

Further, the two metal sheets are respectively connected with the metallized layers on the outer surfaces of the two glass plates to be sealed in an air-tight welding manner.

Further, the metallized layers are prepared on the edges of the glass plates to be sealed; and the metal sealing sheet consists of a metal sheet, and the metal sheet is respectively connected with the metallized layers on the two glass plates to be sealed in an air-tight welding manner by a metal brazing process or an ultrasonic welding process.

Further, the metal sealing sheet consists of a metal sheet, the section of which is U-shaped; and two side edges of the U-shaped metal sheet are respectively connected with the metallized layers on the two glass plates to be sealed in an air-tight welding manner.

Further, the U-shaped metal sheet is positioned between the two glass plates to be sealed, and the side edges of the U-shaped metal sheet are connected with the metallized layers in an air-tight welding manner by the metal brazing process.

Further, the two side edges of the U-shaped metal sheet are positioned between the two glass plates to be sealed and connected with the metallized layers in an air-tight welding manner by the metal brazing process, and the bottom of the U-shaped section of the metal sheet partially extends out of the two glass plates.

Further, one side of the U-shaped metal sheet is positioned between the two glass plates to be sealed and connected with the metallized layer on the inner surface of one glass plate in an air-tight welding manner by a metal brazing process or an ultrasonic welding process, and the other side of the metal sheet bypasses the edge of the other glass plate and then is connected with the metallized layer on the outer surface of the glass plate in an air-tight welding manner by the metal brazing process or the ultrasonic welding process.

Further, the U-shaped metal sheet wraps the edges of the two glass plates to be sealed, and two side edges of the U-shaped metal sheet are respectively connected with the metallized layers on the outer surfaces of the two glass plates in an air-tight welding manner by a metal brazing process or an ultrasonic welding process.

A vacuum glass comprises at least two glass plates compounded mutually, and the rims of the vacuum glass are sealed in an air-tight manner according to the sealing method mentioned above.

By sintering the metallized layers on the surfaces of the glass plates and sealing the edges of the glass plates in an air-tight manner by using the metallized layers and a metal sealing sheet, a brand-new technical means is provided for making the vacuum glass. The method has the advantages of firm connection in sealing positions, high air tightness, favorable thermal shock resistance and the like. Moreover, temperature deformation generated by the temperature difference between the two glass plates to be sealed can be well adapted by adopting the metal sealing sheet, heavy high stress on the sealed edges of the vacuum glass is avoided, and the using safety of the vacuum glass is ensured.

BRIEF DESCRIPTION OF DRAWINGS

FIG. 4 is a structural schematic diagram of the embodiment 1 of a vacuum glass of the present invention;

FIG. 6 is a structural schematic diagram of the embodiment 2 of the present invention;

FIG. 14 is a structural schematic diagram of the embodiment 10 of the present invention; and FIG. 15 is a structural schematic diagram of the embodiment 11 of the present invention.

Figure 1:
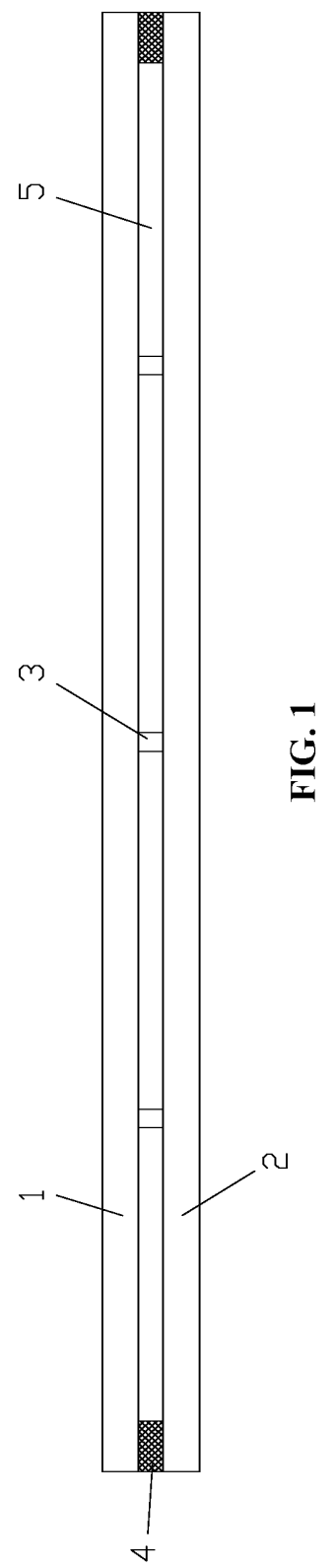
FIG. 1 is a structural schematic diagram of the existing vacuum glass.

In the diagrams, reference number 1 refers to upper glass plate; reference number 2 refers to lower glass plate; reference number 3 refers to middle support spacer; reference number 4 refers to rigid sealing edge on the existing vacuum glass; reference number 5 refers to vacuum space between two glass plates; reference number 6 refers to metallized layers sintered on the surfaces of the glass plates; reference number 7 refers to metal sheet; reference number 7a refers to upper side edge of the metal sheet 7 with U-shaped section; reference number 7b refers to lower side edge of the metal sheet 7 with U-shaped section; reference number 7-1 refers to upper metal sheet, reference number 7-2 refers to lower metal sheet; reference number 8 refers to middle glass plate, and reference number 9 refers to arc connecting section on the metal sheet 7.

DETAILED DESCRIPTION

The present invention is further explained by combining the drawings as follows.

Figure 2:
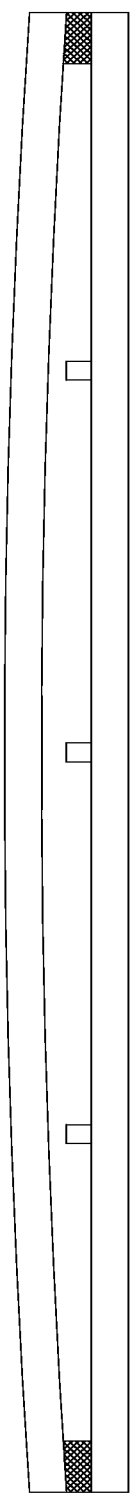
FIG. 2 is a schematic diagram of the existing vacuum glass in FIG. 1 when deformation is generated owing to inner and outer temperature difference.
Figure 3:
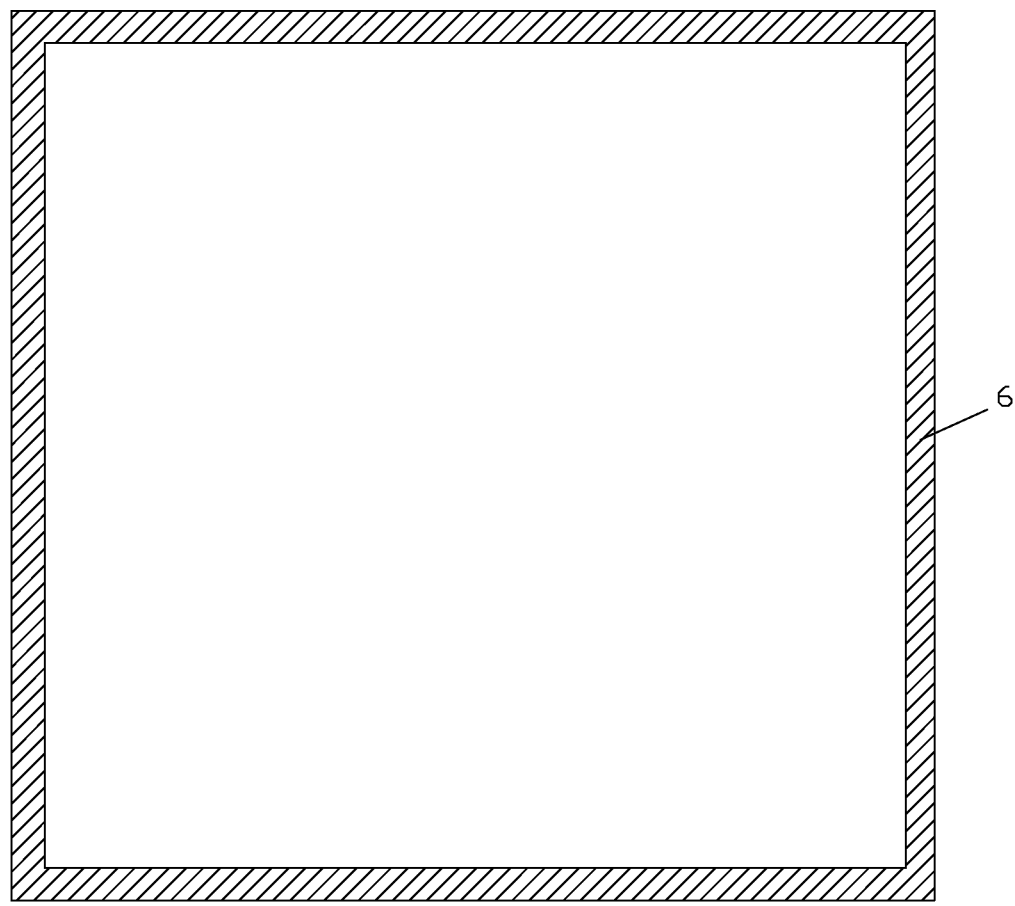
FIG. 3 is a schematic diagram after metallized layers are sintered on the surfaces of the parts to be sealed on the edges of glass plates.
Figure 5:
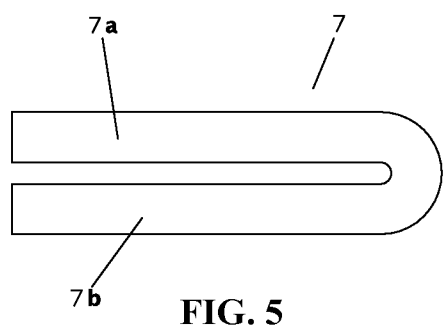
FIG. 5 is a sectional shape amplification schematic diagram of a metal sheet 7 in the embodiment 1.

By taking the embodiment 1 shown as FIG. 4 as an example, when the vacuum glass is made according to the sealing method of the present invention, wherein the sealing method comprises the following steps: preparing a metal paste coating on the surfaces to be sealed on the edges of the glass plates; heating the glass plates to sinter the metal paste coating into the metallized layers 6 consolidated with the glass plates, wherein the sintered metallized layers 6 are shown as FIG. 3; compounding the two glass plates 1 and 2 to be sealed according to the state shown as the FIG. 4, and arranging the metal sheet 7 with the U-shaped section shown as FIG. 5 between the two mutually corresponding metallized layers 6 on the two glass plates 1 and 2, so that the two side edges 7a and 7b of the metal sheet 7 are respectively opposite to the metallized layers 6 on the upper and lower glass plates; arranging a metal brazing solder between the side edges 7a and 7b of the metal sheet 7 and the metallized layers 6; and finally, connecting the two side edges 7a and 7b of the metal sheet 7 and the respectively corresponding metallized layers 6 in an air-tight welding manner by adopting a metal brazing process to complete air-tight sealing of the edges of the two glass plates 1 and 2. Reference number 3 in FIG. 2 refers to a middle support spacer arranged between the two glass plates 1 and 2, and reference number 5 refers to a vacuum space formed between the two sealed glass plates 1 and 2.

The metal paste coating is prepared on the surfaces of the glass plates in a manner of dip coating, spray coating, screen printing, manual coating or mechanical coating.

When the metal paste coating is sintered, a manner of laser heating, flame heating, electric current heating, inductive heating or microwave heating can be adopted.

When a metal brazing solder is arranged between the side edges 7a and 7b of the metal sheet 7 and the metallized layers 6 on the glass plates 1 and 2, the solder can be processed into a metal foil, and the metal foil is placed between the metal sheet 7 and the metallized layers 6; or the solder metal is pre-plated on the side edges 7a and 7b of the metal sheet 7 and/or pre-plated on the surfaces of the metallized layers 6, and subsequent welding is completed according to the metal brazing process.

The used solder can be a tin alloy solder.

The brazing process can be performed under the protection of an inert gas or in an environment of $H_2$ gas or $N_2$ gas, and can also be performed in a vacuum environment, thus improving the brazing quality.

Because the metal sheet 7 and the metallized layers 6 are mutually connected in a welding manner by a metal brazing process, the metal sheet 7 and the metallized layers 6 are made of metal materials suitable for brazing.

For avoiding the influence of the welding process on the performance of the glass plates, the temperature of the metal brazing process should be controlled to be less than or equal to 350° C.

Various proper heating manners such as inductive heating, laser heating, microwave heating and the like can be adopted in the metal brazing process.

In the embodiment 2 of the present invention shown as FIG. 6, two side edges 7a and 7b of the metal sheet 7 with the U-shaped section are positioned between the upper and lower glass plates to be sealed and respectively connected with the metallized layers 6 on the upper and lower glass plates in an air-tight welding manner by a metal brazing process, and the bottom of the U-shaped section of the metal sheet 7 partially extends out of the two glass plates. Compared with the embodiment 1 in the FIG. 4, the metal sheet 7 in the embodiment has higher deformation margin and can adapt to relatively higher temperature deformation between the two glass plates.

Figure 7:
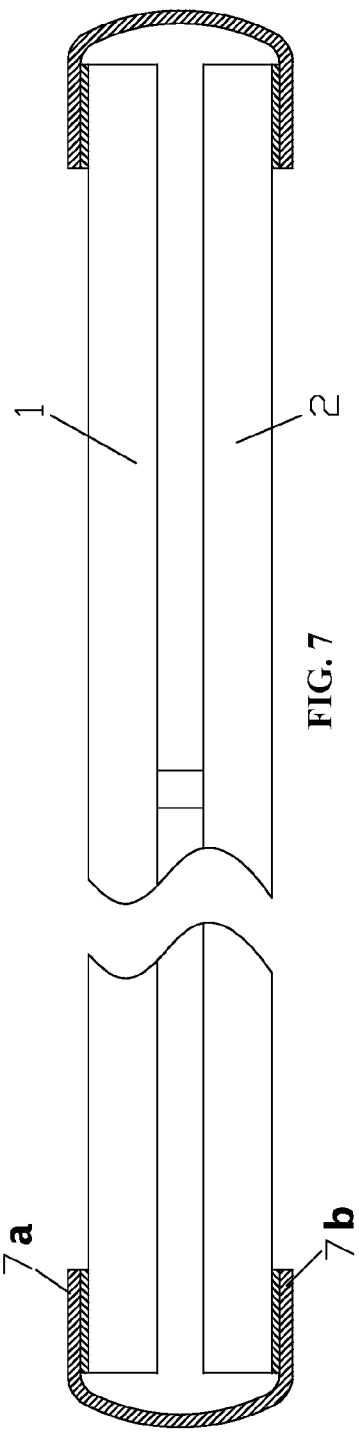
FIG. 7 is a structural schematic diagram of the embodiment 3 of the present invention.

In the embodiment 3 shown as FIG. 7, the metal sheet 7 with the U-shaped section wraps the edges of the upper and lower glass plates 1 and 2 to be sealed, and the two side edges 7a and 7b of the metal sheet 7 are respectively connected with the metallized layers 6 on the outer surfaces of the two glass plates 1 and 2 in an air-tight welding manner.

Figure 8:
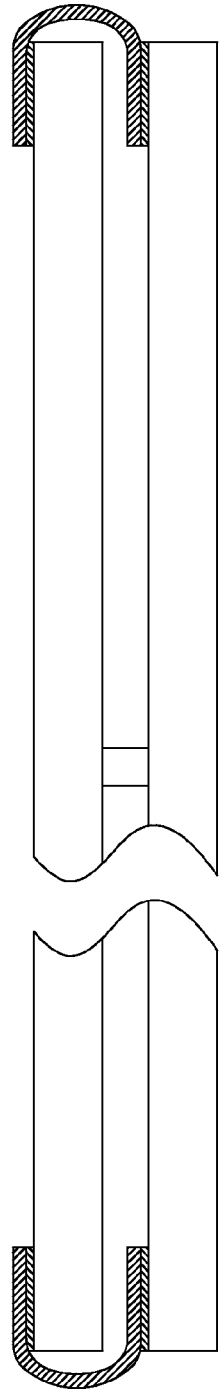
FIG. 8 is a structural schematic diagram of the embodiment 4 of the present invention.

In the embodiment 4 shown as FIG. 8, one side of the metal sheet 7 with the U-shaped section is positioned between the two glass plates to be sealed and connected with the metallized layer 6 on the inner surface of lower glass plate in an air-tight welding manner, and the other side of the metal sheet 7 bypasses the edge of the upper glass plate and then is connected with the metallized layer 6 on the outer surface of the upper glass plate in an air-tight welding manner.

It should be pointed that when the vacuum glass shown as the FIG. 7 and the FIG. 8 is made, the two side edges of the metal sheet 7 are connected with the metallized layers 6 in an air-tight welding manner by a metal brazing process or an ultrasonic welding process.

The vacuum glass in the embodiments shown as the FIG. 4 to the FIG. 8 is formed by compounding two glass plates, the metal sheet 7 with the U-shaped section is used as a metal sealing sheet, and a vacuum glass comprising three or more glass plates can also be made.

Figure 9:
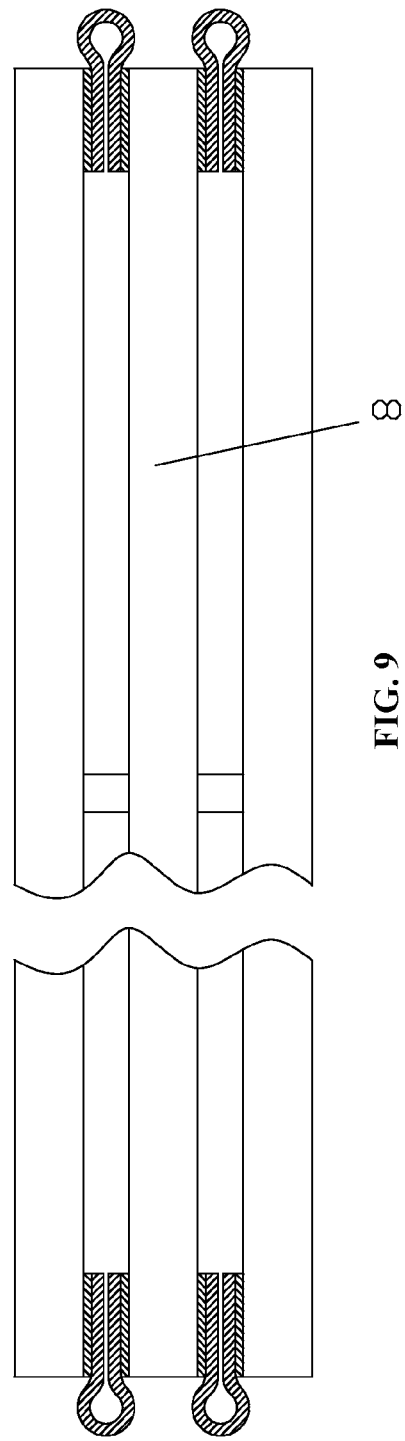
FIG. 9 is a structural schematic diagram of the embodiment 5 of the present invention.

In the embodiment 5 shown as FIG. 9, the vacuum glass is formed by compounding three glass plates. Different from the vacuum glass compounded by using two glass plates, the metallized layers 6 are sintered on two side surfaces of a glass plate 8 positioned in the middle, so that the glass plate 8 is respectively sealed with the two glass plates positioned above and below the glass plate 8 in an air-tight manner through the metal sheet 7 with the U-shaped section.

The metal sealing sheet used in the sealing method of the present invention can consist of one metal sheet, and can also consist of two metal sheets.

Figure 10:
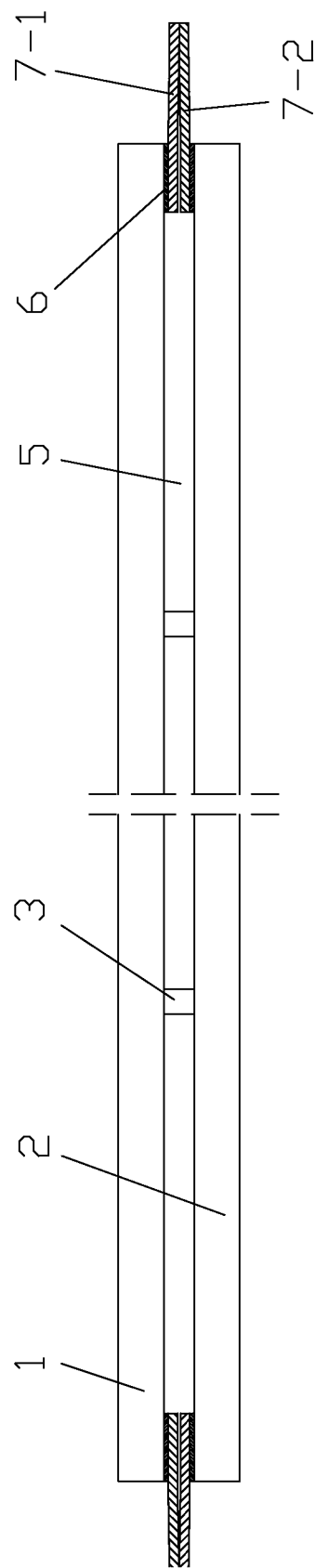
FIG. 10 is a structural schematic diagram of the embodiment 6 of the present invention.

When the metal sealing sheet consists of two metal sheets, the sealing steps are as follows:

By taking the embodiment 6 shown as FIG. 10 as an example, it comprises the following steps: as above mentioned, sintering the metallized layers 6 consolidated with the glass plates as the FIG. 3 on the surfaces to be sealed on the edges of the glass plates; respectively connecting the upper and lower metal sheets 7-1 and 7-2 with the metallized layers 6 on the upper and lower glass plates 1 and 2 in an air-tight welding manner, and leading the metal sheets 7-1 and 7-2 out of the connected glass plates; and finally, compounding the two glass plates 1 and 2 according to the state shown as the FIG. 10, and connecting the parts extending out of the two glass plates on the two metal sheets 7-1 and 7-2 in an air-tight welding manner to realize air-tight sealing of the edges of the two glass plates 1 and 2.

The metal sheets 7-1 and 7-2 are connected with the metallized layers 6 on glass plates 1 and 2 in an air-tight welding manner by a metal brazing process or an ultrasonic welding process.

The parts extending out of the glass plates on the two metal sheets 7-1 and 7-2 are connected in an air-tight welding manner by adopting a metal brazing process or an ultrasonic welding process.

Figure 11:
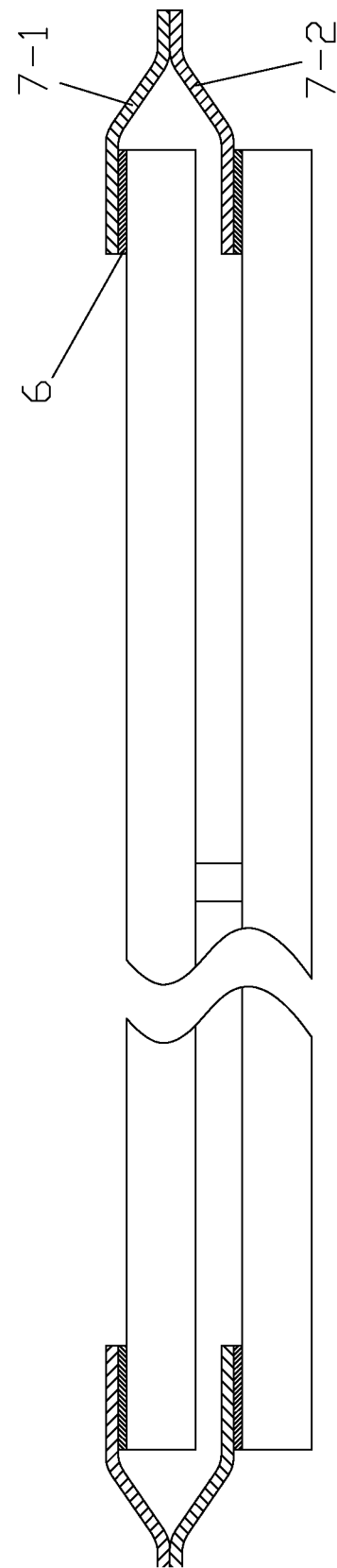
FIG. 11 is a structural schematic diagram of the embodiment 7 of the present invention.

FIG. 11 shows the embodiment 7 of the present invention. Compared with the embodiment 6, the metal sheet 7-2 in the embodiment 7 is led out of the space between the two glass plates and connected with the metallized layer 6 on the inner surface of the lower glass plate in an air-tight welding manner, and the metal sheet 7-1 is connected with the metallized layer 6 on the outer surface of the upper glass plate in an air-tight welding manner.

Figure 12:
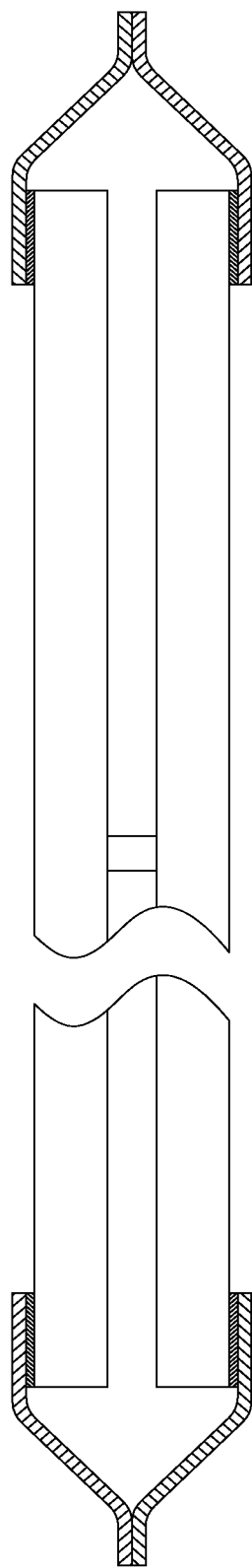
FIG. 12 is a structural schematic diagram of the embodiment 8 of the present invention.

FIG. 12 shows the embodiment 8 of the present invention. In the embodiment, the two metal sheets 7-1 and 7-2 are respectively connected with the metallized layers 6 on the outer surfaces of the two glass plates in an air-tight welding manner.

Figure 13:
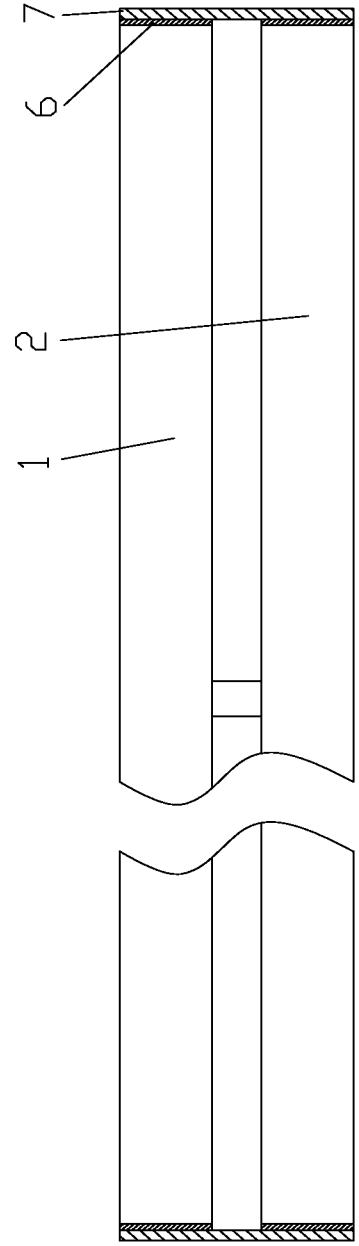
FIG. 13 is a structural schematic diagram of the embodiment 9 of the present invention.

FIG. 13 shows the embodiment 9 of the present invention. The vacuum glass in the embodiment is formed by compounding three glass plates. As mentioned above, the metallized layers 6 are sintered on the upper and lower surfaces of the glass plate 8 positioned in the middle, so that the glass plate 8 is respectively sealed with the two glass plates positioned above and below the glass plate 8 in an air-tight manner through the metal sheets 7-1 and 7-2.

FIG. 14 shows the embodiment 10 of the present invention. As a special embodiment of the present invention, in the embodiment, the metallized layers 6 are sintered on the edges of the glass plates 1 and 2. The edges of the two glass plates 1 and 2 are sealed through a metal sheet 7, and the metal sheet 7 is respectively connected with the metallized layers 6 on the edges of the two glass plates 1 and 2 in an air-tight welding manner.

In order that the metal sheet 7 can adapt to relatively high telescopic deformation owing to the temperature difference between the edges of the inner and outer glass plates, shown as the embodiment 11 in FIG. 15, an arc connecting section 9 can be arranged on the middle part of the metal sheet 7 in the embodiment 10.

The embodiments shown as the FIG. 14 and the FIG. 15 are simple in structure, convenient to operate and particularly suitable to be adopted when the glass plates are thick.

The above examples are just used for describing the present invention. Embodiments of the present invention shall not be limited to the examples described here, and various specific manners of execution carried out by the skilled person in the art under the condition of perceiving the invention all should be within the extent of protection in the invention.

The invention claimed is:

1. A method for sealing a vacuum glass comprising the following steps:
   1) preparing metallized layers on surfaces to be sealed at edges of two glass plates via a sintering process; and
   2) connecting a metal sealing sheet between the metallized layers of the two glass plates to be sealed in an air-tight manner to realize air-tight sealing of the edges of the two glass plates;
   wherein the metal sealing sheet comprises a U-shaped metal sheet and wherein two sides of the U-shaped metal sheet are respectively connected with the metallized layers on the two glass plates to be sealed in an air-tight manner;
   wherein one side of the U-shaped metal sheet is positioned between the two glass plates to be sealed and connected with the metallized layer on an inner surface of one glass plate in an air-tight manner by a metal brazing process or an ultrasonic brazing process, and the other side of the U-shaped metal sheet goes around an edge of the other glass plate and then is connected with the metallized layer on an outer surface of the glass plate in an air-tight manner by the metal brazing process or the ultrasonic brazing process.

2. The method according to claim 1, wherein the sintering process comprises the following steps:
   1-1) preparing a metal paste coating on the surfaces to be sealed on the edges of the glass plates; and
   1-2) heating the glass plates to sinter the metal paste coating into the metallized layers consolidated with the glass plates.

3. The method according to claim 2, wherein the metal paste coating is prepared on the surfaces of the glass plates in a manner of dip coating, spray coating, screen printing, manual coating or mechanical coating.

4. A method for sealing vacuum glass, comprising the following steps:
   1) preparing metal paste coatings on surfaces to be scaled on edges of two glass plates;
   2) locally heating the positions of the metal paste coating to sinter the metal paste coatings into two metallized layers bonded with the edges of the two glass plates, respectively; and
   3) directly air-tightly joining the two metallized layers on the two glass plates to scaled by brazing two metal sheets with the two metallized layers on the edges of the two glass plates, respectively;
   wherein one of the two metal sheets is positioned between the two glass plates and is brazed onto one of the two metallized layers sintered on an inner surface of one of the two glass plates and the other of the two metal sheets is positioned onto an outer surface of the other of the two glass plates and is brazed onto the other of the two metallized layers sintered on the outer surface of the other of the two glass plates; and
   wherein edges of the two metal sheets protruding from the edges of the two glass plates are joined together by a metal brazing process or an ultrasonic welding process.

* * * * *